US012728448B2

(12) United States Patent
Harrison et al.

(10) Patent No.: US 12,728,448 B2
(45) Date of Patent: Sep. 8, 2026

(54) REMOVING VULCANIZED RUBBER FROM METAL COMPONENTS

(71) Applicant: CAN CLEANTECH, Fredericton (CA)

(72) Inventors: Brian H. Harrison, Kanata (CA); Hurdon A. Hooper, Fredericton (CA); Matthew Ness, Fredericton (CA); Alex Kyle, Kanata (CA)

(73) Assignee: CAN CLEANTECH, Fredericton (CA)

( * ) Notice: Subject to any disclaimer, the term of this patent is extended or adjusted under 35 U.S.C. 154(b) by 59 days.

(21) Appl. No.: 18/881,105

(22) PCT Filed: Jul. 5, 2023

(86) PCT No.: PCT/CA2023/050908
§ 371 (c)(1),
(2) Date: Jan. 3, 2025

(87) PCT Pub. No.: WO2024/007077
PCT Pub. Date: Jan. 11, 2024

(65) Prior Publication Data

US 2026/0001108 A1 Jan. 1, 2026

Related U.S. Application Data

(60) Provisional application No. 63/358,304, filed on Jul. 5, 2022.

(51) Int. Cl.

*B08B 9/027* (2006.01)
*C08J 11/06* (2006.01)
*C08J 11/10* (2006.01)

(52) U.S. Cl.
CPC ............... *B08B 9/027* (2013.01); *C08J 11/06* (2013.01); *C08J 11/10* (2013.01); *B08B 2209/027* (2013.01); *C08J 2321/00* (2013.01)

(58) Field of Classification Search
CPC ........ C08J 11/06; C08J 11/10; C08J 2321/00; B08B 9/027; B08B 2209/027
See application file for complete search history.

(56) References Cited

U.S. PATENT DOCUMENTS 4,046,834 A * 9/1977 Lee .......................... C08J 11/06
521/42.5
4,305,850 A * 12/1981 Watabe .................... C08J 11/18
521/42.5

(Continued)

FOREIGN PATENT DOCUMENTS

| | | |
|---|---|---|
| CN | 101285133 | 10/2008 |
| CN | 101966735 | 2/2011 |
| JP | 2008221150 | 9/2008 |

OTHER PUBLICATIONS

Machine Translation of CN101285133A (Year: 2008).*

(Continued)

*Primary Examiner* — Sharidan Carrillo
(74) *Attorney, Agent, or Firm* — Tucker Ellis LLP

(57) ABSTRACT

Vulcanized rubber can be removed from a metal component such as a pipe by exposing the vulcanized rubber to a swelling agent. The vulcanized rubber absorbs the swelling agent, causing the rubber to swell and put stress on the bond between the rubber and metal. After a sufficient period of time, the vulcanized rubber can be easily removed from the metal component.

15 Claims, 8 Drawing Sheets

(56) References Cited

U.S. PATENT DOCUMENTS

| | | | | |
|---|---|---|---|---|
| 5,602,186 | A * | 2/1997 | Myers | C08J 11/16<br>521/41 |
| 6,303,705 | B1 * | 10/2001 | Shimizu | C08J 7/02<br>525/333.1 |
| 2021/0087343 | A1 * | 3/2021 | Harrison | C08J 11/14 |
| 2026/0001108 | A1 * | 1/2026 | Harrison | B08B 9/027 |

OTHER PUBLICATIONS

Machine Translation of CN101966735A (Year: 2011).*
Machine Translation of JP2008-221150A (Year: 2008).*
International Search Report and written opinion for PCT/CA2023/050908, dated Sep. 19, 2023, 8 pages.

* cited by examiner

REMOVING VULCANIZED RUBBER FROM METAL COMPONENTS

RELATED APPLICATION

The current application claims priority to U.S. provisional application 63/358,304 filed Jul. 5, 2022 and titled "Removing Vulcanized Rubber From Metal Components," the entire contents of which are incorporated herein by reference in their entirety.

TECHNICAL FIELD

The current disclosure relates to a process for removing vulcanized rubber from metal components, and in particular to such a process that leaves the metal components suitable for re-use.

BACKGROUND

Parts formed from vulcanized rubber bonded to a metal structure are used in many industrial applications. The rubber portion of the rubber/metal parts may be worn down in use, resulting in an eventual need for replacement of the part. Although the part may need to be replaced as a result of the worn rubber, the metal portion of the part may be largely unaffected. Although the rubber may be worn down, there may still be significant rubber remaining adhered to the metal part making re-use of the metal portion difficult.

Previous techniques to remove vulcanized rubber from the metal components by sawing or chiseling the rubber off, applying excessive amounts of heat or burning the rubber off in a furnace. Other rubber removal techniques have attempted to use ammonia or amine to dissolve the bond between vulcanized rubber and the metal component. While the previous techniques may remove the rubber from the metal component they may be undesirable for various reasons.

It would be desirable to have a process for effectively removing vulcanized rubber from a metal part.

SUMMARY

In accordance with the present disclosure there is provided a method for processing a part having vulcanized rubber on a metal component comprising: exposing the part to a swelling agent for a period of time sufficient to cause the vulcanized rubber to absorb the swelling agent at a swelling ratio of between 1.5 and 3 in order to swell the rubber and stress a bond between the vulcanized rubber and the metal component; removing the part from the exposure to the swelling agent; and stripping the vulcanized rubber from the metal component.

In a further embodiment of the method, the method further comprises: heating the swelling agent while exposing the part to the swelling agent.

In a further embodiment of the method, the swelling agent is heated to between 15° C. and 249° C.

In a further embodiment of the method, in exposing the part to the swelling agent comprises exposing the part in the swelling agent and a solvent.

In a further embodiment of the method, the solvent dissolves or softens a layer bonding the vulcanized rubber to the metal part.

In a further embodiment of the method, exposing the part to the swelling agent comprises soaking the part in a liquid form of the swelling agent.

In a further embodiment of the method, exposing the part to the swelling agent comprises exposing the part to a vapour form of the swelling agent.

In a further embodiment of the method, further comprises processing the metal part after stripping the vulcanized rubber from the metal component.

In a further embodiment of the method, processing the metal part comprises sand blasting the metal part and reusing the sand blasted metal part.

In a further embodiment of the method, further comprises processing the vulcanized rubber after stripping the vulcanized rubber from the metal component.

In a further embodiment of the method, processing the vulcanized rubber comprises one or more of: devulcanizing the vulcanized rubber; and depolymerizing the vulcanized rubber.

BRIEF DESCRIPTION OF THE DRAWINGS

Further features and advantages of the present disclosure will become apparent from the following detailed description, taken in combination with the appended drawings, in which.

DETAILED DESCRIPTION

Parts may be formed from vulcanized rubber bonded to a metal structure. For example, metal pipes may be lined, either externally, or internally, or both, with vulcanized rubber to protect the pipe from damage. The rubber can provide a wearing surface to protect the metal pipe. Rubber may provide additional protection for the metal pipe or part such as providing corrosion and/or chemical resistance, vibration resistance and/or dampening, electrical resistance and/or insulation. Additionally and/or alternatively the rubber may provide a more malleable surface for the part. Regardless of the purpose of the rubber on the metal part, the rubber may become worn or otherwise unfit for the intended purpose, which may require the pipe or part to be repaired or replaced. Although the rubber may be worn, the metal pipe may be substantially undamaged. Removing the remaining rubber from the metal pipe in a manner that does not damage the metal pipe can allow the metal pipe to be re-used or recycled.

As described further below, a process for removing vulcanized rubber from metal components such as pipes, involves soaking or otherwise exposing the part in a swelling agent that causes the vulcanized rubber to swell which puts stress on the bond between the rubber and metal. Depending upon how the metal component is manufactured, the rubber may be adhered to the metal part using an adhesive. Depending upon the type of adhesive used, the part may also be soaked with a solvent to aid in the breaking of the adhesive layer. After the rubber has been soaking in, or otherwise exposed to, the swelling agent, and possibly the adhesive solvent, for a sufficient period of time, the rubber can be physically separated from the metal components. The vulcanized rubber may fall off the metal part or may be pulled, peeled, scrapped or otherwise removed from the metal component. The removed vulcanized rubber can be further processed, such as by devulcanization processes, depolymerization processes or other recycling processes. Similarly, the metal component may be further cleaned and prepared for reuse or recycling.

Figure 1:
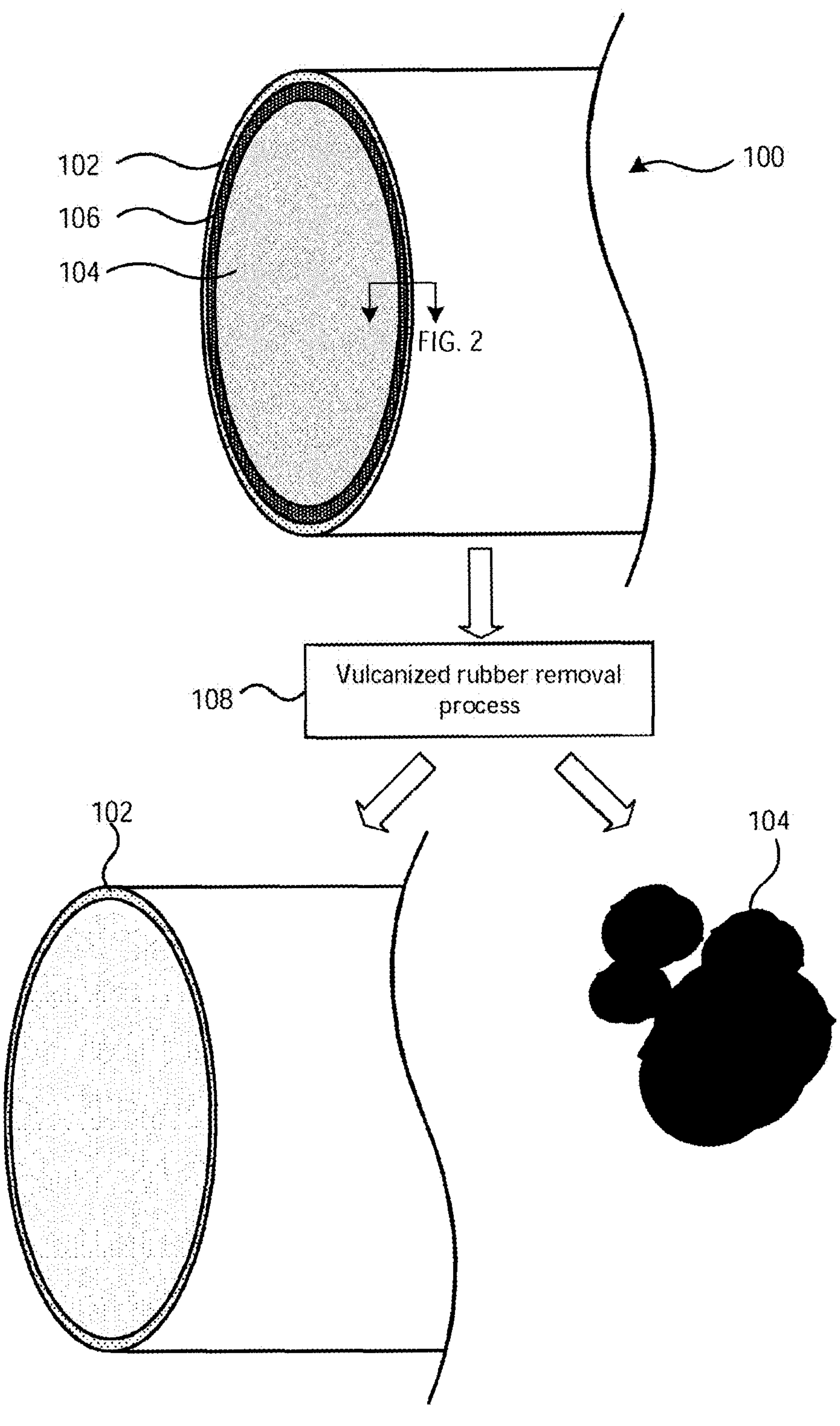
FIG. 1 depicts a process of removing a vulcanized rubber lining from a metal pipe.
Figure 2:
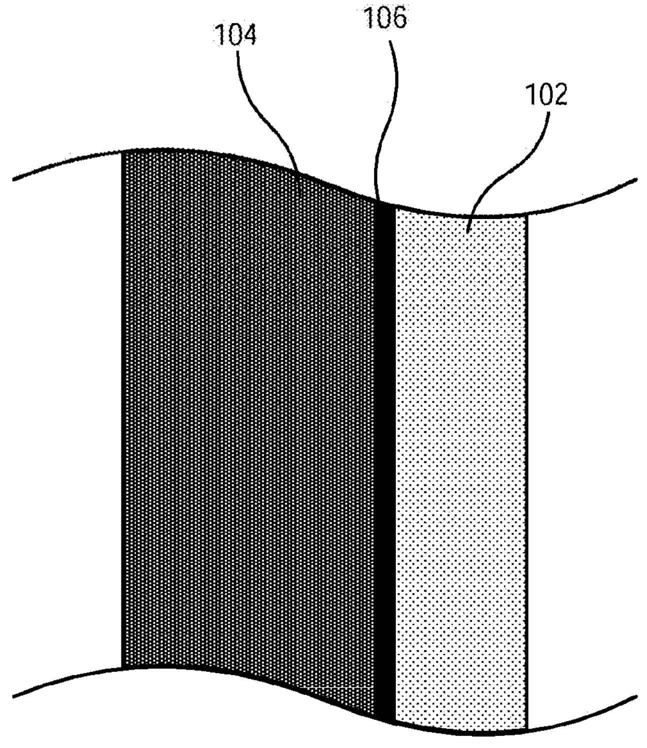
FIG. 2 depicts a schematic of a cross section of the rubber-lined metal pipe of FIG. 1.

FIG. 1 depicts a process of removing a vulcanized rubber lining from a metal pipe. A pipe 100 may comprise a metal pipe 102 and a vulcanized rubber lining 104. The rubber 104 may be directly vulcanized to the metal, or may be affixed by other adhesives. Regardless of whether directly vulcanized or bonded with a separate adhesive, the bond can be viewed as a thin layer 106 between the metal part 104 and the vulcanized rubber 102. Although depicted as being a rubber lining on an internal portion of the pipe, the rubber may additionally or alternatively be provided on an exterior of the pipe or on another metal surface. FIG. 2 depicts a schematic of a cross section of the rubber-lined metal pipe of FIG. 1.

The pipe 100 is submitted to a rubber removal process 108, which is described in further detail below. The rubber removal process 108 removes the rubber 104 from the metal pipe without damaging the metal pipe 102 by soaking the pipe 100 in, or exposing the pipe to, a swelling agent for a time sufficient to weaken the connection of the rubber to the pipe. The metal pipe 102 may be reused and/or recycled. The rubber that is removed from the pipe, depicted as rubber 110, may be re-used or submitted to other processes, such as a devulcanization process and possibly a de-polymerization process.

Figure 3:
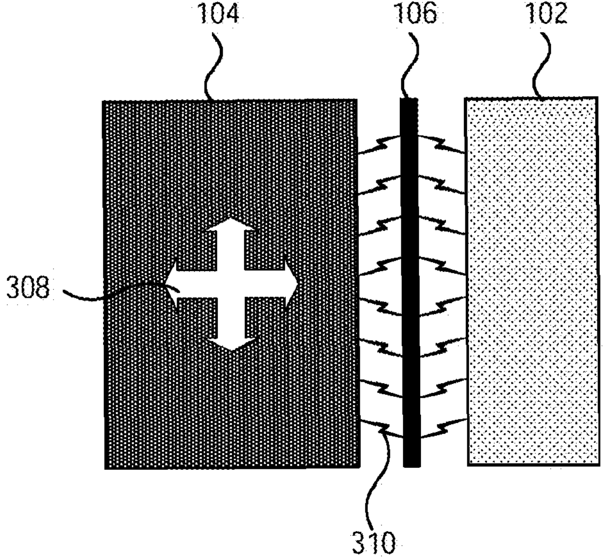
FIG. 3 depicts a schematic of the rubber/metal part of FIG. 2 after soaking in a swelling agent.

FIG. 3 depicts a schematic of the rubber/metal part of FIG. 2 after soaking in or being exposed to a swelling agent. As depicted, the vulcanized rubber 104 absorbs the swelling agent (not shown) and expands as a result, represented by arrows 308. The swelling and expansion of the rubber 104 puts stress on the on the bond 106 between the metal pipe 102 and rubber 104, represented by graphically in FIG. 2 by bolts 310.

This swelling puts considerable strain on the bonds between the adhesive layer 106, the rubber 104 and the metal 102 significantly weakening the connection. The weakened connection allows the rubber to be removed from the metal. The swelling may also allow solvent(s) to access the adhesive layer through the rubber. The swelling agent may comprise one or more of Toluene, benzene, ethyl benzene, xylene, cyclohexanes, mesitylene, tetralin, cyclohexanone, D-limonene, cymene, ethylene glycol mono butyl ether (2-butoxyyethanol), alkanes (e.g., hexanes, heptanes, and higher longer chain alkanes), and chlorinated solvents (e.g., tetrachloroethylene, trichloroethane, chloroform, carbon tetrachloride etc.).

Depending upon the characteristics of the adhesive used to bond the rubber to the metal, the swelling agent alone may not be sufficient to free the rubber from the metal pipe. A softening solvent may be used in addition to the swelling agent to weaken the adhesive layer. The absorption of softening solvent by the adhesive may also soften it and weaken it. The swelling caused as a result of soaking the rubber in the swelling agent may allow the softening agent to more readily access the adhesive layer. The softening solvent may comprise one or more of Alcohols (e.g., methanol, ethanol, isopropyl alcohol, etc.), ketones (e.g., acetone, methyl ethyl ketone, methyl isobutyl ketone, etc.), longer chain alkanes (e.g., kerosene, mineral spirits, mineral oil, white spirits etc.).

The swelling of the rubber, possibly in coordination with the weakening of the adhesive by the softening solvent(s), allows the rubber to be separated from the metal. Depending upon the parameters used in the rubber removal process, the rubber may fall off the pipe or may be removed for example by peeling, pulling or stripping in other ways from the metal.

Mild heat can be used to accelerate the diffusion of the swelling agent and possibly the softening solvent through the rubber and enhance the effect of the swelling agent and/or softening solvent on the adhesive. It is also possible to use multiple swelling agents and/or softening solvents to create multiple effects (i.e. the swelling of the rubber and weakening of the adhesive).

Figure 4:
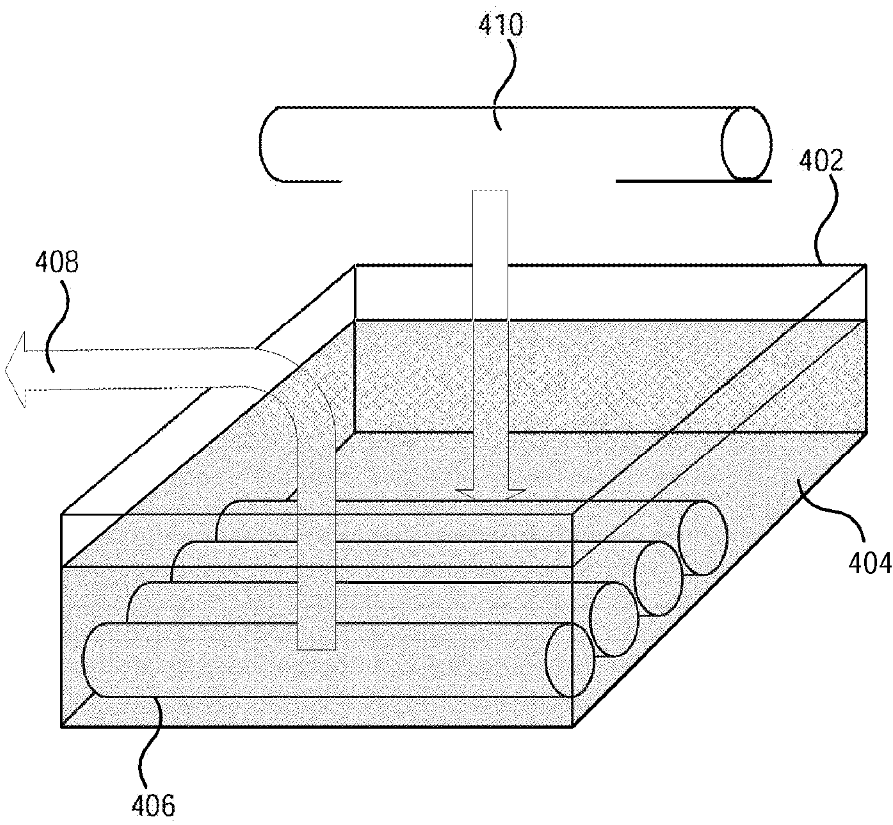
FIG. 4 depicts a process for removing rubber from rubber-lined metal pipes.

FIG. 4 depicts a process for removing rubber from rubber-lined metal pipes. The process depicted in FIG. 4 may be used to remove rubber from multiple pipes. The process uses a large container 402 that is at least partially filled with a solution of a swelling agent and a softening solvent 404. The solution may be heated. A plurality of sections of pipes 406 may be placed within the container 402 and are covered by the solution 404. Depending upon the size of the pipes, different material handling equipment may be used for moving the pipes. Once a pipe has been soaking in the time for a sufficient period of time, the pipe may be removed from the solution as depicted by arrow 408 and the rubber may be removed from the pipe. Additional pipes 410 may be placed into the solution as other pipes are removed to provide continuous processing of the pipes. It is possible that the rubber will fall off the pipe and remain in the container 402. The container 402 may include elements for filtering and removing rubber from the container.

As described above, the rubber removal process exposes the rubber to a swelling agent, and possibly a softening solvent. The swelling agent is absorbed by the rubber, causing it to swell and put stress on the bonds between the rubber and the metal allowing the rubber to be removed. Although FIG. 4 depicts a process in which the metal is submerged in the swelling agent to soak, it is possible to expose the rubber to the swelling agent in other ways.

Figure 5A:
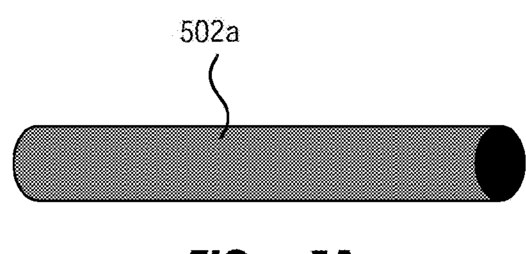
FIGS. 5A-5C depict additional processes for removing rubber from rubber-lined metal pipes.

FIG. 5A depicts a further process for removing rubber from the interior of a metal pipe. The metal pipe may be sealed at its ends and filled with the swelling agent and possibly the solvent. The pipe 502*a* may be sealed in various ways such as welding end caps on to the pipe, securing end caps with appropriate clamps, securing a membrane over the ends, etc. The sealing of the pipe may be done after filling the pipe with the swelling agent, or the sealing may include on or more features allowing the pipe to be filled after sealing the ends such as a fill spout or port. Regardless of how the pipes are sealed, once sealed they can be left to soak for the sufficient period of time to allow the rubber to swell sufficiently. Once the sufficient period of time has passed, the pipes can be unsealed and the swelling agent emptied. While the process depicted in FIG. 5A soaks all of the rubber in the swelling agent, it can require a relatively large amount of swelling agent to fill the pipe. Additionally, if there is a leak or problem with the seal, the large volume of swelling agent may be difficult to contain.

Figure 5B:
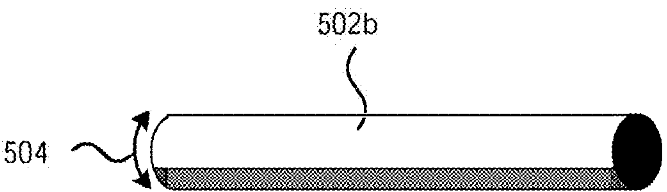

FIG. 5B depicts a further process for removing rubber from the interior of a metal pipe. The process depicted in FIG. 5B is similar to that of 5A in that the pipe 502*b* is sealed and swelling agent added. However, rather than filling the pipe with swelling agent as depicted in FIG. 5A, the pipe is sealed and only partially filled with swelling agent, and possibly the adhesive solvent. As depicted in FIG. 5B, with the pipe only partially filled, not all of the rubber will be soaked in the swelling agent and possibly the adhesive solvent. The pipe 502*b* may be rotated 504, either continuously or periodically, in order to expose all of the rubber to the swelling agent, and possibly the adhesive solvent The rubber removal process described above relies on the rubber absorbing the swelling agent and expanding to stress the connection to the metal part as described with particular reference to FIG. 3. The rubber absorbs the swelling agent over time as it is soaked in the swelling agent. Accordingly, the process of partially filling the pipe with the swelling agent may take longer than completely filling the pipe as a portion of the rubber is only exposed to the swelling agent for a portion of the processing time.

The rubber absorbing the swelling agent is a transport process controlled by diffusion. The diffusion of the swelling agent through rubber can be measured by a diffusion coefficient and a solubility coefficient. The diffusion coefficient quantifies the rate at which the swelling agent goes through the rubber, and the solubility coefficient quantifies how much swelling agent has been absorbed by the rubber.

The diffusion rate is based on concentration gradients. That is the swelling agent concentration outside the rubber, and the concentration inside the rubber. A liquid has a much higher solvent concentration, or number of molecules per cc, compared to a vapour. Processing the rubber using a liquid swelling agent can significantly speed up the process compared to using a vapour swelling agent.

The solubility coefficient provides a swelling ratio of how much solvent is absorbed by the rubber when exposed/submerged in a liquid for a period of time such as a couple of days. For the rubbers often used in coating of pipes the swelling ratio of the swelling agent was measured to be about 2.0, meaning there is twice as much swelling agent in the rubber as there is rubber itself, after it has been submerged in the swelling agent for a sufficiently long period of time. The swelling agents with a high swelling ratio can also transport/carry other solvents, such as the adhesive solvent, through the rubber to the bonding agent.

The above has described the rubber removal process as using a swelling agent in liquid form. While such a process may be convenient, it is possible to use a gaseous or vapour form of the swelling agent. In testing, similar swelling ratios were achieved by exposing the rubber to the vapour form of the swelling agent, albeit for a longer period of time.

Figure 5C:
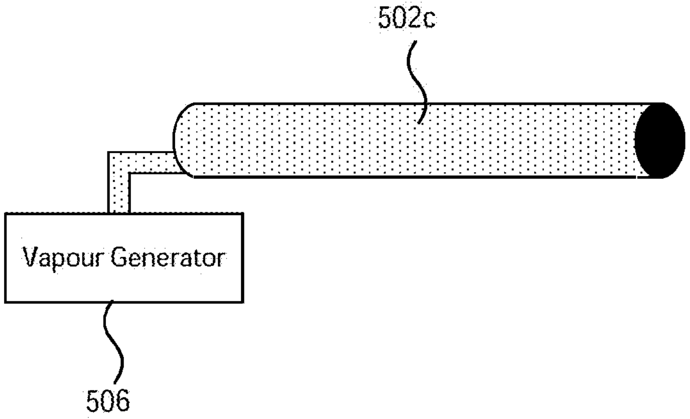

FIG. 5C depicts a further process for removing rubber from the interior of a metal pipe. Similar to the processes described above, the process depicted in FIG. 5C exposes the rubber on an interior of a pipe 502*c* to the swelling agent in vapour form. The pipe 502*c* may be sealed as done with pipes 502*a*, 502*b*. The vapour swelling agent may be generated by a vapour generator 506 or other process and provided to the interior of the pipe. Although not depicted in FIG. 5C, the sealed pipe may include an outlet to allow the vapour swelling agent to be continuously circled through the pipe. While the process may be slower when using a vapour swelling agent, it may be easier and/or safer and/or provide other benefits for certain applications. Although not depicted in FIG. 5C, it is possible to use both liquid and vapour swelling agent. For example, pipe could be partially filled with liquid swelling agent and using vapourous swelling agent in the remainder space of the pipe.

Figure 6:
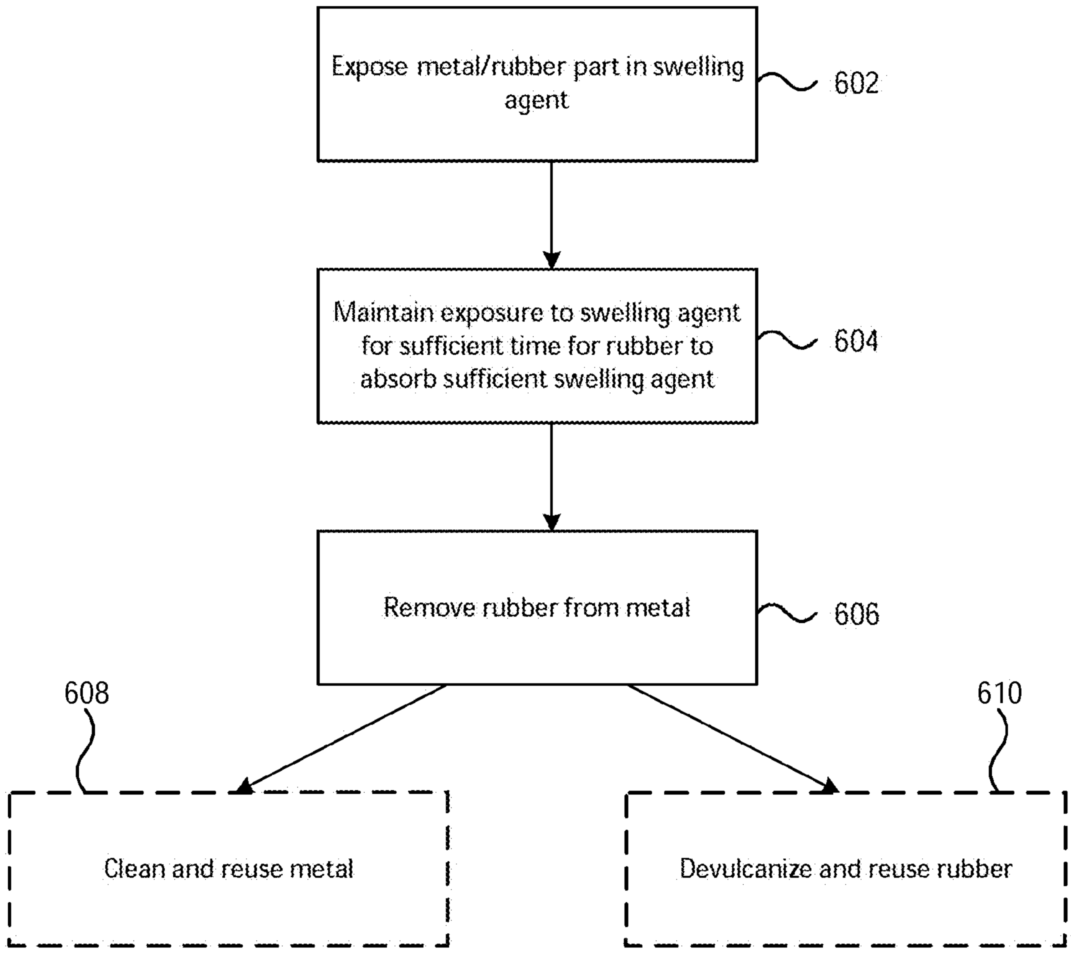
FIG. 6 is a method for removing rubber from a metal component.

FIG. 6 is a method for removing rubber from a metal component. The method of separating the rubber from the metal 600 is accomplished by exposing the item to be treated in a swelling agent, or swelling agents (602). The part may be exposed to the swelling agent for example by soaking the part in liquid swelling agent or filling or partially filling the part with liquid swelling agent. Additionally or alternatively, the part may be exposed to the swelling agent in vapour form. The part is exposed to the swelling agent(s) for sufficient time to absorb a sufficient amount of swelling agent to swell the rubber and stress the adhesive bond (604). The amount of time to allow the rubber to swell a sufficient amount may vary depending upon the part and other factors. However, as an example, the part may be soaked for an amount of time sufficient to allow the swelling solvent(s) to be absorbed by the rubber at a swelling ratio of between 1.5 and 3. That is, the rubber swells by absorbing between one and a half to three times its own weight in solvent. The amount of time may be determined for different parts through testing. Swelling solvents include many aromatic, aliphatic, and halogenated hydrocarbons, including petroleum, oils, and lubricants. The diffusion of oils and lubricants into rubber is very slow and may or may not be desirable for an industrial process. To be able to get the molecules quickly into the rubber with considerable swelling, the solvents chosen are typically low molecular weight compounds (less than 10 carbon atoms in the molecule) with high solubility and diffusion coefficients. These include but are not limited to, toluene, benzene, xylene, cyclohexanes, mesitylene, tetraline, cyclohexanone, D-liminene, cymene, ethylene glycol mono butyl ether (2-butoxyethanol), hexanes, heptanes, trichloroethane, chloroform, and other halogenated solvents. Chlorinated solvents, for example, offer the advantage of being less flammable. Once the part has been exposed for a sufficient period of time, it can be removed, and possibly dried, and the rubber removed from the metal (606). The metal parts may then be cleaned and reused (608) if desired. Similarly, vulcanized rubber can be processed, for example by devulcanizing and reusing the rubber (610).

Figure 7:
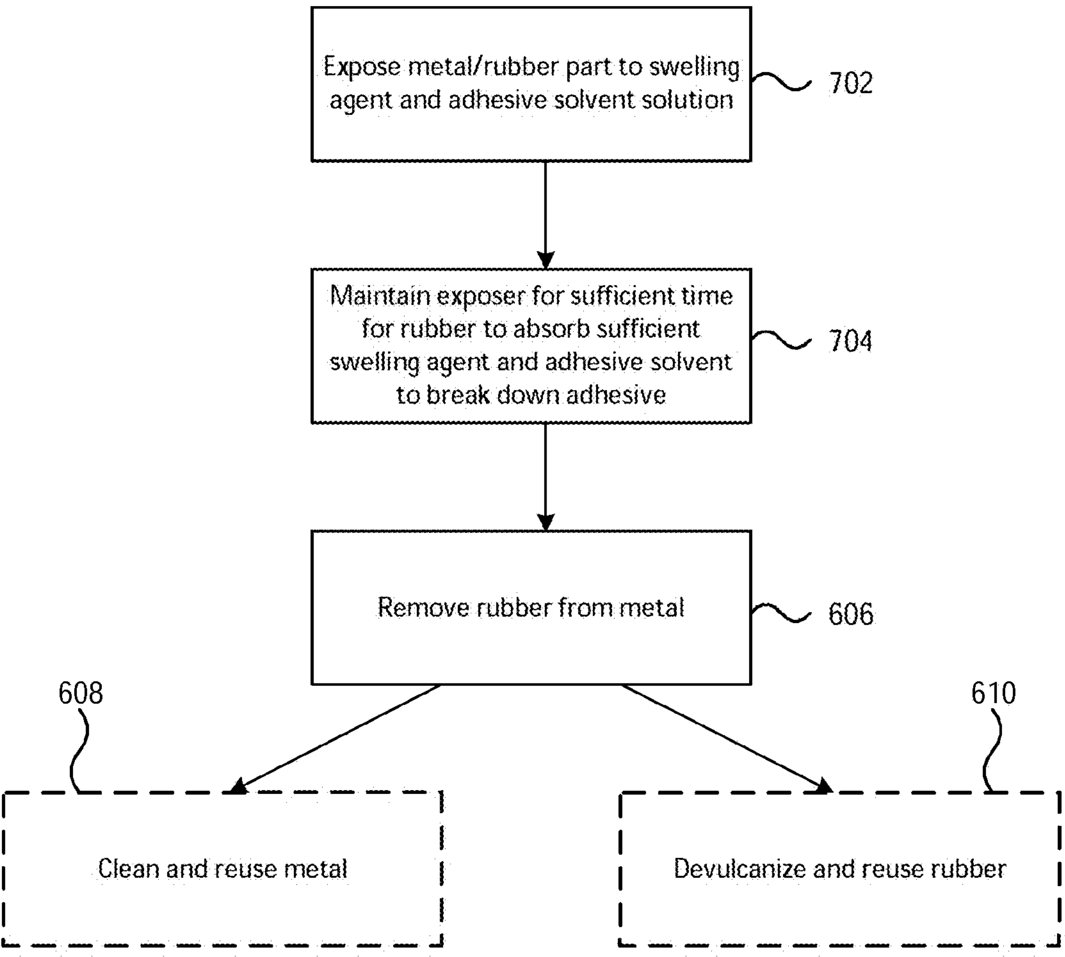
FIG. 7 is a further method for removing rubber from a metal component.

FIG. 7 is a further method for removing rubber from a metal component. The method 700 includes exposing the rubber/metal part in a swelling agent along with a softening solvent that can dissolve or soften the adhesive (702). The swelling agent and softening solvent may be heated and maintained at an elevated temperature. The swelling agent may be heated for example to a temperature between 15° C. and 249° C. Although it is possible to heat the swelling agent, the process may be carried out at room temperature. The rubber/metal part is exposed to the swelling agent and softening solvent for a sufficient time for the rubber to absorb a sufficient amount of the swelling agent (704). In addition to placing stress on the adhesive bond, the swelling of the rubber may help with the diffusion of the solvent into the adhesive. Once the rubber/metal part has been exposed for a sufficient length of time, the part can be removed from the swelling agent and solvent and then the rubber removed from the metal as described above (606). The metal part and the removed rubber may then be further processed as desired for example by cleaning and reusing the metal (608) and devulcanizing and reusing the rubber (610).

Figure 8:
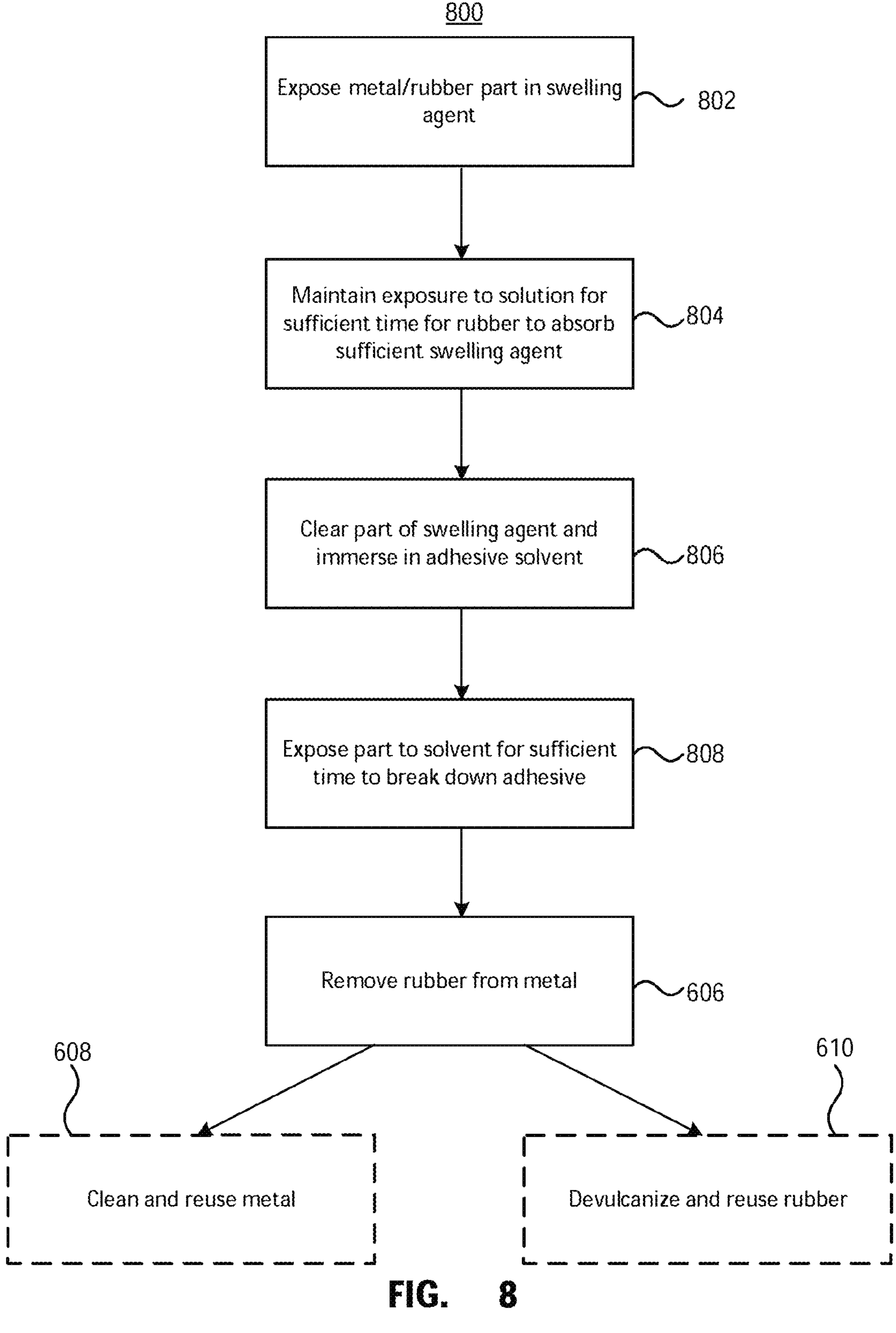
FIG. 8 is a further method for removing rubber from a metal component.

FIG. 8 is a further method for removing rubber from a metal component. The method 800 includes exposing the rubber/metal part to a swelling agent (802). The rubber/metal part is exposed in the swelling agent for a sufficient time for the rubber to absorb a sufficient amount of the swelling agent (804). The part may be removed from the swelling agent and exposed to an adhesive solvent (806). The part is exposed in the softening solvent for a sufficient time to break down the adhesive (808). The swelling agent and/or softening solvent may be heated and maintained at an elevated temperature of for example between 60° C. and 249° C. In addition to placing stress on the adhesive bond, the swelling of the rubber may help with the diffusion of the adhesive solvent into the adhesive. Once the rubber/metal part has been exposed for a sufficient length of time, the part can be removed from the softening solvent and then the rubber removed from the metal as described above (606). The metal part and the removed rubber may then be further processed as desired for example by cleaning and reusing the metal (608) and devulcanizing and reusing the rubber (610).

In testing the above process, a rubber lined pipe 4-inches in diameter, and 4 inches long was soaked in toluene at 100° C. for 5 hours. All the rubber dropped off the metal. Additionally, a rubber lined pipe 4-inches in diameter, and 4 inches long was soaked in toluene at 25° C. for 48 hours. All the rubber dropped off the metal. Further, a rubber lined pipe 4-inches in diameter, and 4 inches long was soaked in a solution of tetrachloroethylene with 10% methyl isobutyl ketone at 50° C. for 500 hours. All the rubber dropped off the metal.

While the above has described a process for removing vulcanized rubber from a metal component with particular regard to a pipe, it will be appreciated that the process can scaled up to process larger quantities of parts in an industrial process. Once the process parameters have been determined for example through testing of different parameters, the parts can be processed in large batches at once.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

Numerous additional variations on the methods and apparatus of the various embodiments described above will be apparent to those skilled in the art in view of the above description. Such variations are to be considered within the scope.

What is claimed is:

1. A method for removing vulcanized rubber from an interior of a pipe comprising:

sealing at least a first end of a pipe having vulcanized rubber on an interior surface thereof;

at least partially filling the pipe with a swelling agent;

exposing the vulcanized rubber on the interior surface of the pipe to the swelling agent for a period of time sufficient to cause the vulcanized rubber to absorb the swelling agent at a swelling ratio of between 1.5 and 3 in order to swell the rubber and stress a bond between the vulcanized rubber and the interior surface of the pipe;

removing the swelling agent from the pipe after the period of time has elapsed; and stripping the vulcanized rubber from the interior surface of the pipe.

2. The method of claim 1, further comprising:

heating the swelling agent while exposing the pipe to the swelling agent.

3. The method of claim 1, wherein in exposing the pipe to the swelling agent comprises exposing the pipe in the swelling agent and a solvent.

4. The method of claim 1, wherein exposing the pipe to the swelling agent comprises exposing the pipe to a vapor form of the swelling agent.

5. The method of claim 1, further comprising processing the pipe after stripping the vulcanized rubber from the interior surface of the pipe.

6. The method of claim 1, further comprising:

sealing a second end of the pipe.

7. The method of claim 1, wherein the pipe is substantially fully filled with the swelling agent.

8. The method of claim 1, wherein the pipe is only partially filled with the swelling agent.

9. The method of claim 1, wherein the swelling agent is in vapor form.

10. The method of claim 2, wherein the swelling agent is heated to between 15° C. and 249° C.

11. The method of claim 3, wherein the solvent dissolves or softens a layer bonding the vulcanized rubber to the pipe.

12. The method of claim 5, wherein processing the pipe comprises sand blasting the pipe and reusing the sand blasted pipe.

13. The method of claim 5, further comprising processing the vulcanized rubber after stripping the vulcanized rubber from the interior surface of the pipe.

14. The method of claim 8, further comprising rotating the partially filled pipe to expose all of the vulcanized rubber on the interior surface of the pipe to the swelling agent.

15. The method of claim 13, wherein processing the vulcanized rubber comprises one or more of:

devulcanizing the vulcanized rubber; and depolymerizing the vulcanized rubber.

* * * * *